United States Patent
Lou et al.

(10) Patent No.: US 11,440,489 B2
(45) Date of Patent: Sep. 13, 2022

(54) OPERATOR CAB FOR A WORK VEHICLE WITH REDUCED NOISE REFLECTION

(71) Applicant: CNH Industrial America LLC, New Holland, PA (US)

(72) Inventors: Bin Lou, Bolingbrook, IL (US); Samrendra K. Singh, Bolingbrook, IL (US); Mark D. Klassen, Lockport, IL (US); David S. Booth, Fargo, ND (US); Kaushal Ghorpade, Chicago, IL (US); Panos Tamamidis, Mount Prospect, IL (US); Nathan J. Keller, Harwood, ND (US)

(73) Assignee: CNH Industrial America LLC, New Holland, PA (US)

( * ) Notice: Subject to any disclaimer, the term of this patent is extended or adjusted under 35 U.S.C. 154(b) by 239 days.

(21) Appl. No.: 16/722,906

(22) Filed: Dec. 20, 2019

(65) Prior Publication Data

US 2021/0188196 A1    Jun. 24, 2021

(51) Int. Cl.
*B60R 13/08* (2006.01)
*B60R 13/02* (2006.01)
*B62D 33/06* (2006.01)
*E02F 9/16* (2006.01)

(52) U.S. Cl.
CPC ...... *B60R 13/0815* (2013.01); *B60R 13/0225* (2013.01); *B62D 33/0617* (2013.01); *E02F 9/16* (2013.01); *B60R 2013/0287* (2013.01)

(58) Field of Classification Search
CPC ..... B60R 13/01; B60R 13/02; B60R 13/0225; B60R 13/0815; B62D 33/0604
USPC ................................ 296/1.08, 39.3
See application file for complete search history.

(56) References Cited

U.S. PATENT DOCUMENTS

| | | | |
|---|---|---|---|
| 5,258,585 A | 11/1993 | Juriga | |
| 5,681,072 A | 10/1997 | Strickler | |
| 6,204,209 B1 | 3/2001 | Rozek et al. | |
| 6,279,978 B1 * | 8/2001 | Schreyer | B60H 1/247 |
| | | | 296/190.03 |

(Continued)

FOREIGN PATENT DOCUMENTS

| | | | |
|---|---|---|---|
| EP | 0079253 A1 | 5/1983 | |
| EP | 1800955 A2 * | 6/2007 | ......... B60R 13/0815 |
| JP | 10226283 H | 8/1998 | |

OTHER PUBLICATIONS

"Cab Insulation", by dB Engineering, Cab Insulation—Headliners & Walls, 2017 (2 pages).

(Continued)

*Primary Examiner* — Jason S Daniels
(74) *Attorney, Agent, or Firm* — Rickard K. DeMille; Rebecca L. Henkel

(57) ABSTRACT

An operator cab for a work vehicle includes: a cab enclosure including a roof an operator chair disposed in the cab enclosure; at least one layer of noise-deadening material coupled to the roof; and a headliner coupled to the roof such that the at least one layer of noise-deadening material is at least partially disposed between the headliner and the roof. The headliner includes a noise-reflective material and a noise escape region that comprises at least one opening configured to allow sound waves to pass through the noise escape region into the at least one layer of noise-deadening material and reduce noise reflection by the headliner to the operator chair.

14 Claims, 3 Drawing Sheets

(56) References Cited

U.S. PATENT DOCUMENTS

| | | | |
|---|---|---|---|
| 6,290,022 B1 | 9/2001 | Wolf et al. | |
| 6,322,136 B2 | 11/2001 | Boyce et al. | |
| 6,951,264 B2 | 10/2005 | Byma et al. | |
| 7,503,424 B2 | 3/2009 | Shuttleworth et al. | |
| 8,276,708 B1 | 10/2012 | Balasubramanian et al. | |
| 2003/0062739 A1* | 4/2003 | Bock | B60R 13/08 296/39.3 |
| 2004/0041428 A1 | 3/2004 | Tompson | |
| 2004/0090089 A1* | 5/2004 | Byma | B60R 13/0218 296/214 |
| 2005/0133302 A1 | 6/2005 | Pfaffelhuber et al. | |
| 2007/0137926 A1* | 6/2007 | Albin | B60R 13/0815 181/290 |
| 2009/0301809 A1 | 12/2009 | Aurenz et al. | |
| 2011/0030406 A1* | 2/2011 | Ichikawa | B60H 1/00378 62/244 |
| 2011/0056763 A1* | 3/2011 | Tanase | B60R 13/0815 181/295 |
| 2015/0307036 A1* | 10/2015 | Day | B60N 2/5685 296/39.3 |
| 2020/0332688 A1* | 10/2020 | Skestone | B32B 3/08 |

OTHER PUBLICATIONS

"Cab Insulation for Heavy Equipment", Steve Melito, Elasto Proxy, Mar. 2, 2019 (6 pages).

"Cab Hardware and Insulation Materials Cab Door Handles", Cab Hardware and Insulation Materials, Harold Ag & Mobile Products, Oct. 4, 2007 (20 pages).

* cited by examiner

OPERATOR CAB FOR A WORK VEHICLE WITH REDUCED NOISE REFLECTION

FIELD OF THE INVENTION

The present invention pertains to work vehicles and, more specifically, to work vehicles with operator cabs.

BACKGROUND OF THE INVENTION

In work vehicles, such as tractors, an operator typically sits in an operator cab. The operator cab houses many control devices of the vehicle and is, for example, climate-controlled for operator comfort. One particular issue that detracts from operator comfort is noise inside the operator cab. While sound-deadening materials have reduced noise in the operator cab to improve operator comfort, operator comfort is still detrimentally affected by noise that occurs during operation.

What is needed in the art is a way to reduce noise in the operator cab to increase operator comfort during operation.

SUMMARY OF THE INVENTION

Exemplary embodiments disclosed herein provide an operator cab with a headliner that includes a noise escape region that allows sound waves to pass through into a noise-deadening material and reduces noise reflection by the headliner.

In some exemplary embodiments provided according to the present disclosure, an operator cab for a work vehicle includes: a cab enclosure including a roof; an operator chair disposed in the cab enclosure; at least one layer of noise-deadening material coupled to the roof; and a headliner coupled to the roof such that the at least one layer of noise-deadening material is at least partially disposed between the headliner and the roof. The headliner includes a noise-reflective material and a noise escape region that comprises at least one opening configured to allow sound waves to pass through the noise escape region into the at least one layer of noise-deadening material and reduce noise reflection by the headliner to the operator chair.

In some exemplary embodiments, a work vehicle includes a chassis and an operator cab carried by the chassis. The operator cab includes: a cab enclosure including a roof; an operator chair disposed in the cab enclosure; at least one layer of noise-deadening material coupled to the roof; and a headliner coupled to the roof such that the at least one layer of noise-deadening material is at least partially disposed between the headliner and the roof. The headliner includes a noise-reflective material and a noise escape region that comprises at least one opening configured to allow sound waves to pass through the noise escape region into the at least one layer of noise-deadening material and reduce noise reflection by the headliner to the operator chair.

One possible advantage that may be realized by exemplary embodiments disclosed herein is that the noise escape region of the headliner allows sound waves to pass into the noise-deadening material, rather than being reflected to the operator chair, which reduces the perceived noise by an operator sitting in the operator chair.

Another possible advantage that may be realized by exemplary embodiments disclosed herein is that the headliner may be formed from a rigid material, which normally reflects sound, to reduce cost while also reducing perceived noise due to the noise escape region.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
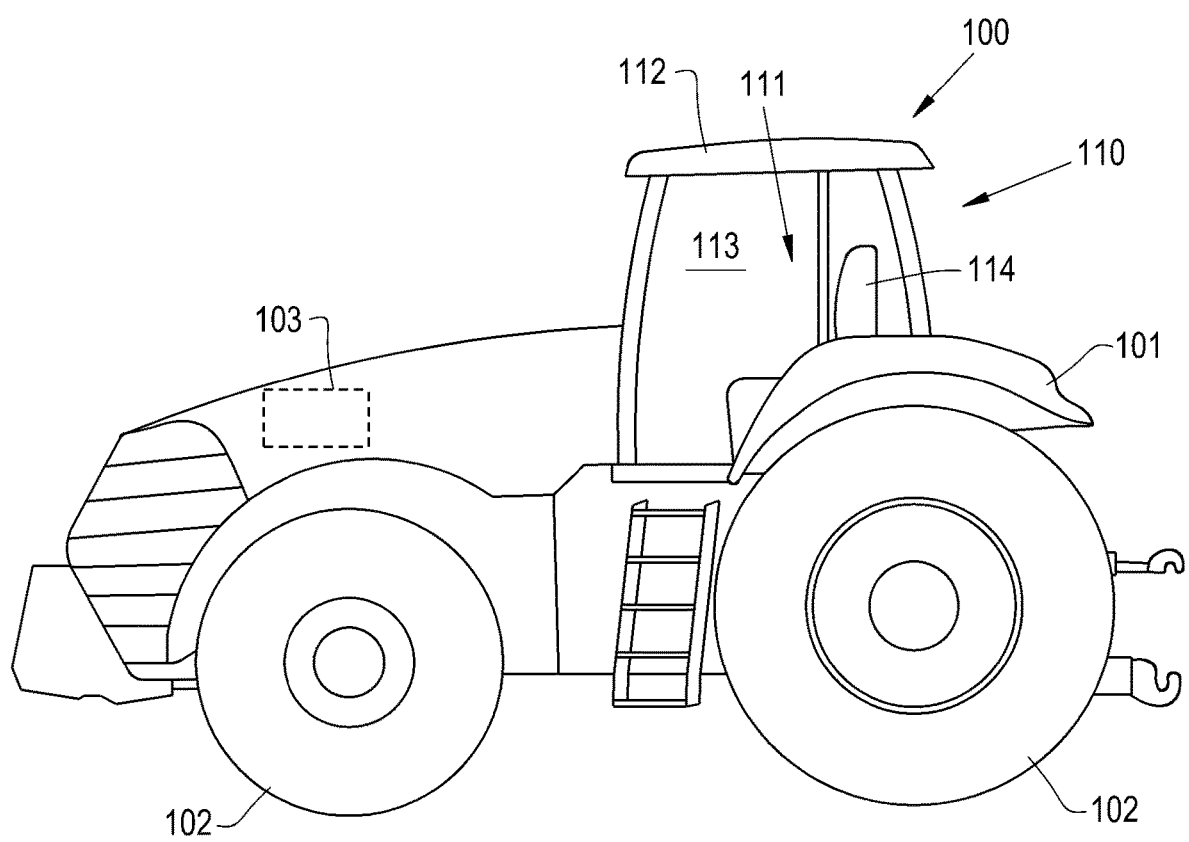
FIG. 1 illustrates a perspective view of an exemplary embodiment of a work vehicle including an operator cab with a headliner, provided in accordance with the present disclosure.

Referring now to the drawings, and more particularly to FIG. 1, an exemplary embodiment of a work vehicle 100, illustrated in the form of a tractor, provided according to the present disclosure is illustrated. The work vehicle 100 includes a chassis 101 and an operator cab 110 that is carried by the chassis 101. Various controls for the work vehicle 100 may be placed in the operator cab 110, as is known. The chassis 101 may be supported by multiple pairs of wheels 102, which are linked to an engine 103 by a transmission to propel the work vehicle 100. It should be appreciated that while the work vehicle 100 is illustrated and described as being in the form of a tractor, the work vehicle provided according to the present disclosure can take other forms, including but not limited to an agricultural harvester, a skid loader, a dozer, etc.

The operator cab 110 includes a cab enclosure 111 that encloses a space inside the operator cab 110 and includes a roof 112, which is coupled to a plurality of side walls 113. An operator chair 114 is disposed inside the cab enclosure 111 and provides a place where an operator may sit while operating the work vehicle 100. Various controls may also be disposed inside the cab enclosure 111, as is known. In some embodiments, the cab enclosure 111 is coupled to an HVAC system that is configured to climate control the cab enclosure 111 and increase operator comfort during operation of the work vehicle 100.

Figure 2:
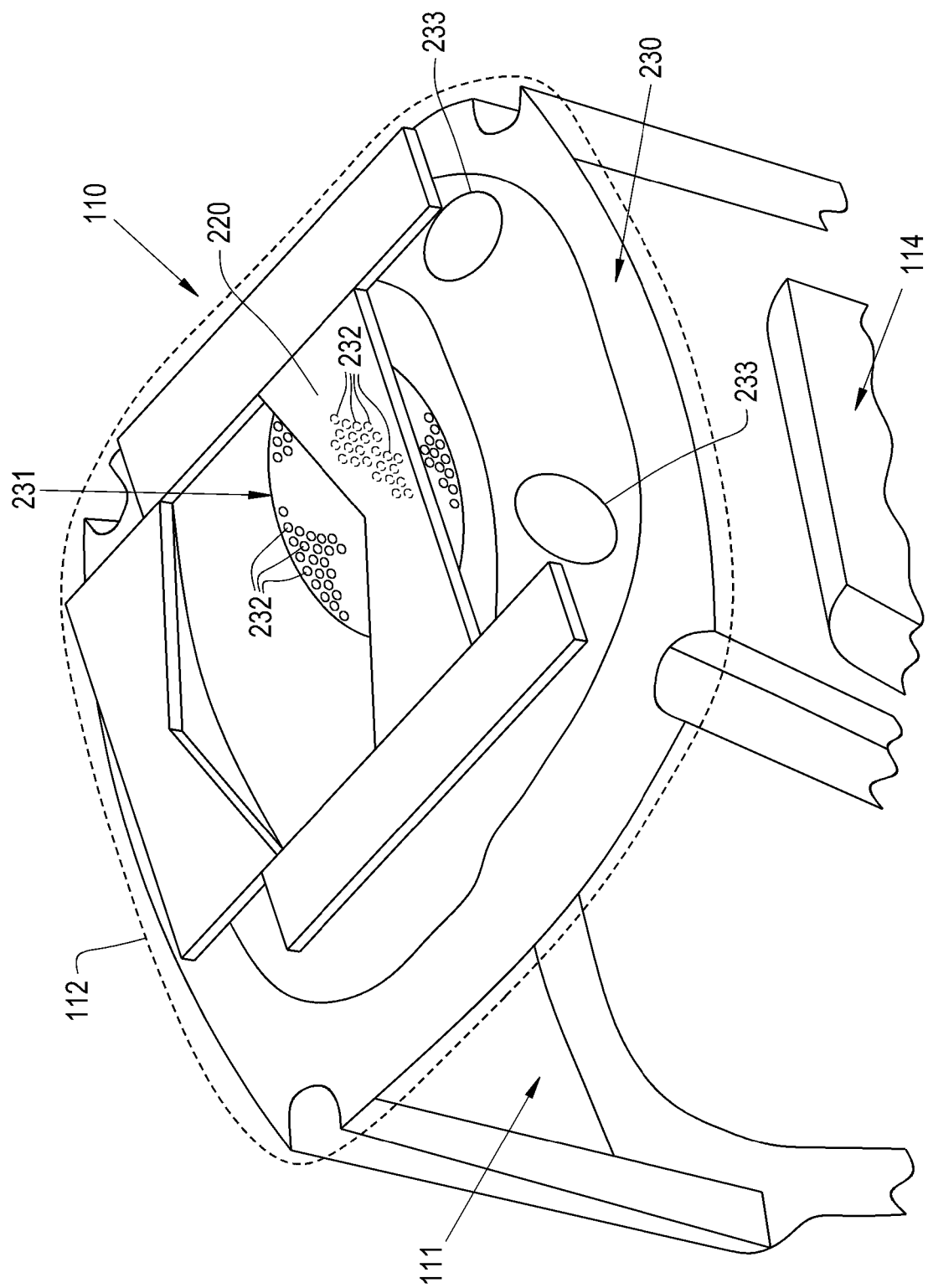
FIG. 2 illustrates a perspective view of an exemplary embodiment of a headliner and a layer of noise-deadening material that are coupled to a roof of the operator cab, provided in accordance with the present disclosure.

Referring now to FIG. 2, the operator cab 110 includes at least one layer of noise-deadening material 220 coupled to the roof 112 and a headliner 230 that is coupled to the roof 112 such that the noise-deadening material 220, such as a foam material, is at least partially disposed between the headliner 230 and the roof 112. As used herein, a material is considered to be "noise-deadening" if sound waves that contact the material do not significantly reflect off the material and/or lose at least 60% of their amplitude upon contact with the material. The noise-deadening material 220 acts as a noise barrier to reduce noise from sound waves that contact the noise-deadening material 220 and shield the operator from noise that originates outside the operator cab 110. In some embodiments, the at least one layer of noise-deadening material 220 comprises multiple layers of the same material; it should be appreciated that the noise-deadening material 220 can also be provided as a single layer of material or, alternatively, multiple layers of different materials that are held together. While the noise-deadening material 220 is illustrated as being completely disposed between the roof 112 and the headliner 230, i.e., an entirety of the noise-deadening material 220 is located between the roof 112 and the headliner 230, in some embodiments only a portion of the noise-deadening material 220, and not the entirety, is located between the roof 112 and the headliner 230.

The headliner 230 comprises a noise-reflective material, such as a rigid polymer, that reflects a substantial amount of noise. As used herein, a material is considered to be "noise-reflective" if sound waves that are reflected off the material have at least 50% of the amplitude of the originating sound wave that contacted the material. In other words, sound waves that contact the noise-reflective material of the headliner 230 tend to deflect off the headliner 230 toward, for example, the operator chair 114 where an operator may be sitting. At least 50% of the headliner 230 may comprise the noise-reflective material; in some embodiments, the headliner 230 entirely consists of the noise-reflective material. The headliner 230 may have a thickness that can vary, depending on the application, with exemplary thickness values being between 4 mm and 5 mm.

In known work vehicles, the headliner is coupled to an interior of the roof and is what the operator sees as "the roof" while seated in the operator cab. In many work vehicles, the headliner is formed from a rigid, sound-reflective polymer. While such a polymer material is attractive from an economic standpoint, it has been found that the sound-reflective properties of the material are detrimental to operator comfort. Specifically, it has been found that operators may believe the noise inside the operator cab is quite high when the headliner is formed from a sound-reflective material due to sound being reflected off the headliner toward the operator chair where the operator sits during operation. The high level of perceived noise by the operator can reduce operator comfort and make it more difficult for an operator to operate the vehicle for sustained periods of time.

Figure 3:
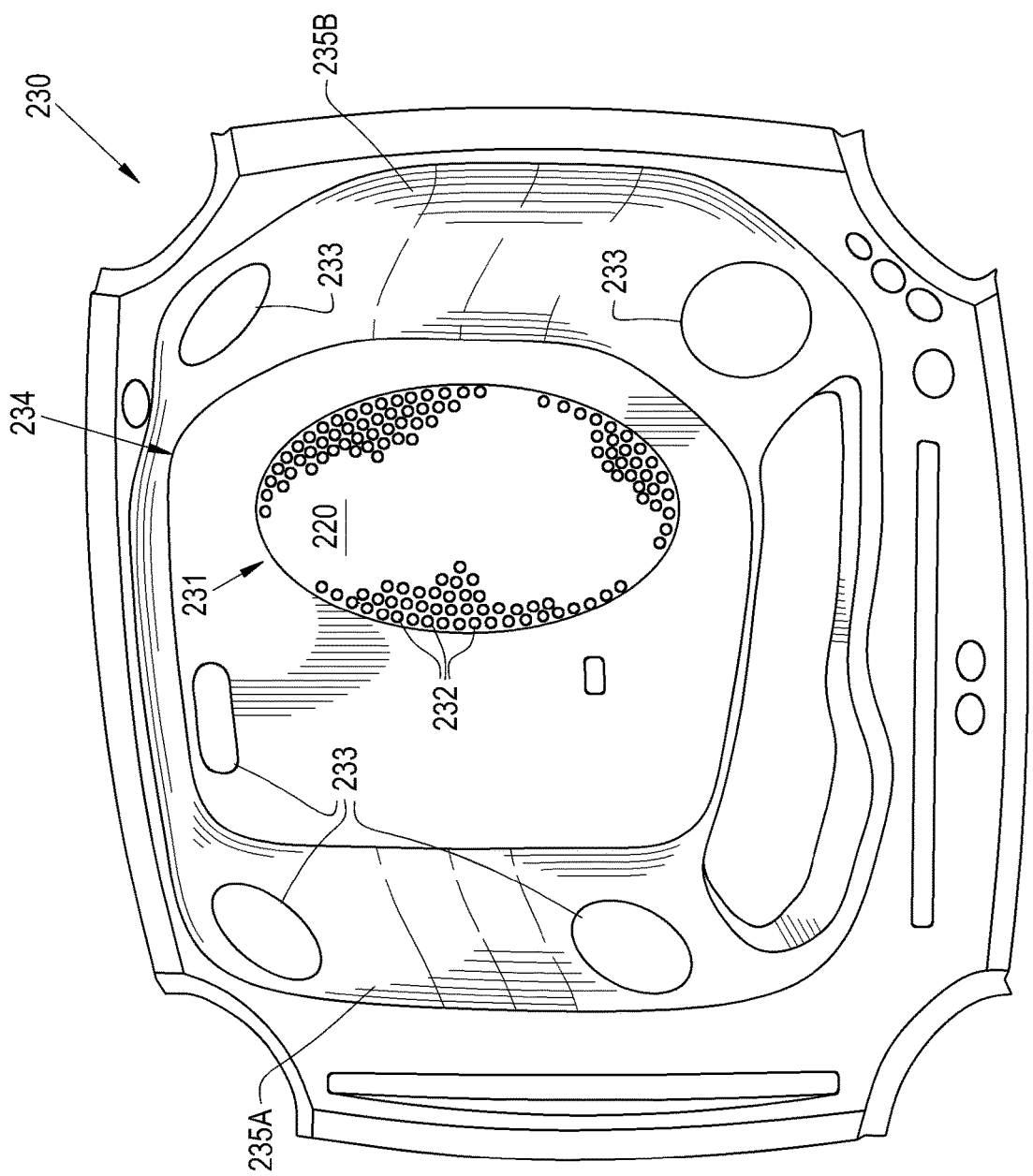
FIG. 3 illustrates a bottom view of the headliner illustrated in FIGS. 1 and 2.

To address some of the previously described issues, and referring now to FIG. 3 as well, the headliner 230 provided according to the present disclosure includes a noise escape region 231 that has at least one opening 232 configured to allow sound waves to pass through the noise escape region 231 into the at least one layer of noise-deadening material 220 and reduce noise reflection by the headliner 230 to the operator chair 114. As illustrated, the noise escape region 231 may include many openings, illustrated as a plurality of perforations formed in the sound-reflective material of the headliner 230, that are sized to allow sound waves to pass through the openings 232. Upon passing through the openings 232, the sound waves contact the noise-deadening material 220 and are absorbed by the material 220 and/or do not reflect off the material 220. In some embodiments, one or more portions of noise-deadening material 220 may be provided in the opening(s) 232 so the opening(s) 232 are filled with noise-deadening material 220. The noise-deadening material 220 may contact both the roof 112 and the headliner 230 to, for example, also act as a vibration dampening material, but it should be appreciated that the noise-deadening material 220 may be spaced from the roof 112 and/or the headliner 230 according to the present disclosure.

The net result of the sound waves passing through the openings 232 and into the noise-deadening material 220 is that the sound waves do not reflect back to the operator chair 114 or reflect back to the operator chair 114 with a significantly decreased amplitude, i.e., noise reflection by the headliner 230 to the operator chair 114 is reduced. Including the noise escape region 231 in the headliner 230 can thus reduce the noise that is perceived by the operator in the operator cab 110 during operation, increasing operator comfort. It should be appreciated that while the one or more openings 232 of the noise escape region 231 are described and illustrated as perforations, in some embodiments the opening(s) may be in the form of one or more cutouts, slots, holes, etc., and it should thus be appreciated that the opening(s) 232 of the noise escape region 231 may be provided in a variety of ways to allow sound to pass through to the noise-deadening material 220.

As illustrated, the noise escape region 231 may be formed as a region of the headliner 230 that has the openings 232 arranged in a defined shape. As illustrated in FIG. 3, the noise escape region 231 may have the defined shape of an oval so the noise escape region 231 is oval-shaped, i.e., the openings 232 are formed in the headliner 230 in an oval-shaped region to allow sound waves to pass through the openings 232 to the noise-deadening material 220 in the oval-shaped noise escape region 231. While the noise escape region 231 is illustrated and described as being oval-shaped, the noise escape region 231 may be provided in a variety of shapes, including but not limited to circular or polygonal. It should be appreciated that while the headliner 230 may include other component openings 233, such openings 233 are filled by components, e.g., lights, and do not allow sound waves to pass through to the noise-deadening material 220.

In some embodiments, the headliner 230 includes a concave region 234 that has a pair of opposed curved surfaces 235A, 235B. Sound waves that reflect off the curved surfaces 235A, 235B tend to be directed toward the operator chair 114, where the reflected sound waves are then heard by the operator. To reduce the effect of this sound-reflecting behavior by the concave region 234, the noise escape region 231 may be formed in the headliner 230 between the curved surfaces 235A, 235B so sound waves that would normally reflect off the curved surfaces 235A, 235B instead pass through the opening(s) 232 of the noise escape region 231. In some embodiments, as can be seen especially in FIG. 2, at least some of the opening(s) 232 of the noise escape region 231 are vertically aligned with the operator chair 114 so the opening(s) 232 are above where the operator's head will be during operation. In such embodiments, the opening(s) 232 of the noise escape region 231 may be closer to one of the curved surfaces, such as the rear curved surface 235B, so the opening(s) 232 are above the operator's head during operation to reduce the noise heard by the operator by allowing sound waves to pass through the opening(s) 232, rather than reflecting towards the operator's ears.

From the foregoing, it should be appreciated that providing the headliner 230 with the noise escape region 231 having one or more openings 232 to allow sound to pass through to the noise-deadening material 220 can reduce the perceived noise level of the operator cab 110. The noise escape region 231 may be placed, for example, near where an operator's head will be during operation to reduce noise reflection and echo near the operator's ears. The decrease in perceived noise can make the operator cab 110 a more comfortable operating environment for an operator. Further, forming the openings 232 in the headliner 230 does not appreciably affect other performance characteristics of the headliner 230 and can be done in an economical fashion. The headliner 230 provided according to the present disclosure can thus reduce perceived noise in the operator cab 110 while also being economical to produce.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An operator cab for a work vehicle, comprising:
a cab enclosure comprising a roof;
an operator chair disposed in the cab enclosure;
at least one layer of noise-deadening material coupled to the roof; and
a headliner coupled to the roof such that the at least one layer of noise-deadening material is at least partially disposed between the headliner and the roof, the headliner comprising a noise-reflective material, a concave region that comprises a pair of opposed curved surfaces that direct sound waves toward the operator chair, and a noise escape region disposed between the pair of opposed curved surfaces, the noise escape region comprising at least one opening configured to allow sound waves to pass through the noise escape region into the at least one layer of noise-deadening material and reduce noise reflection by the headliner to the operator chair.

2. The operator cab of claim 1, wherein the at least one opening comprises a plurality of perforations formed in the sound-reflective material.

3. The operator cab of claim 1, wherein the at least one opening is vertically aligned with the operator chair.

4. The operator cab of claim 1, wherein the at least one layer of noise-deadening material comprises a foam.

5. The operator cab of claim 1, wherein the noise-reflective material comprises a rigid polymer.

6. The operator cab of claim 5, wherein the headliner has a thickness of between 4 mm and 5 mm.

7. The operator cab of claim 1, wherein the noise escape region is oval-shaped.

8. A work vehicle, comprising:
a chassis; and
an operator cab carried by the chassis, the operator cab comprising:
a cab enclosure comprising a roof;
an operator chair disposed in the cab enclosure;
at least one layer of noise-deadening material coupled to the roof; and
a headliner coupled to the roof such that the at least one layer of noise-deadening material is at least partially disposed between the headliner and the roof, the headliner comprising a noise-reflective material, a concave region comprising a pair of opposed curved surfaces that direct sound waves toward the operator chair, and a noise escape region disposed between the pair of opposed curved surfaces, the noise escape region comprising at least one opening configured to allow sound waves to pass through the noise escape region into the at least one layer of noise-deadening material and reduce noise reflection by the headliner to the operator chair.

9. The work vehicle of claim 8, wherein the at least one opening comprises a plurality of perforations formed in the sound-reflective material.

10. The work vehicle of claim 8, wherein the at least one opening is vertically aligned with the operator chair.

11. The work vehicle of claim 8, wherein the at least one layer of noise-deadening material comprises a foam.

12. The work vehicle of claim 8, wherein the noise-reflective material comprises a rigid polymer.

13. The work vehicle of claim 12, wherein the headliner has a thickness of between 4 mm and 5 mm.

14. The work vehicle of claim 8, wherein the noise escape region is oval-shaped.

* * * * *